(12) United States Patent
Kazmi et al.

(10) Patent No.: US 8,150,447 B2
(45) Date of Patent: Apr. 3, 2012

(54) MULTI MODE OUTER LOOP POWER CONTROL IN A WIRELESS NETWORK

(75) Inventors: Muhammad Ali Kazmi, Bromma (SE); Rong Hu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 12/518,544

(22) PCT Filed: Aug. 28, 2007

(86) PCT No.: PCT/SE2007/050587
§ 371 (c)(1),
(2), (4) Date: Jul. 6, 2009

(87) PCT Pub. No.: WO2008/076050
PCT Pub. Date: Jun. 26, 2008

(65) Prior Publication Data
US 2010/0081469 A1     Apr. 1, 2010

(30) Foreign Application Priority Data
Dec. 21, 2006   (SE) ........................................ 0602776

(51) Int. Cl.
*H04B 7/005* (2006.01)
(52) U.S. Cl. .... 455/522; 455/69; 455/452.2; 455/67.11; 455/67.16; 455/115.1; 370/328
(58) Field of Classification Search ............... 455/69, 455/522, 135, 114.2, 220, 513, 13.4, 127.5, 455/343.1, 346, 436, 574, 343, 37.11, 70, 455/239.1, 452.2, 10, 67.11, 67.16, 115.1; 370/328, 335, 342, 320, 252, 318, 337, 442; 714/758; 375/229
See application file for complete search history.

(56) References Cited

U.S. PATENT DOCUMENTS
7,373,161 B2 * 5/2008 Anderson ...................... 455/522
(Continued)

FOREIGN PATENT DOCUMENTS
EP     1583256 A1    10/2005

OTHER PUBLICATIONS
Koo, C-S. et al. "Outer Loop Power Control Using Channel-Adaptive Processing for 3G WCDMA." 57th IEEE Semiannual Vehicular Technology Conference, 2003 (VTC 2003—Spring), vol. 1, Apr. 22-25, 2003, pp. 490-494.
(Continued)

*Primary Examiner* — Tan Trinh
(74) *Attorney, Agent, or Firm* — Coats & Bennett, P.L.L.C.

(57) ABSTRACT

A method and arrangement is provided for adjusting the transmission power of radio signals sent over a radio link from a second node to be received by a first node reducing the transmission power consumption and/or optimizing the radio system capacity. The first node maintains a quality target of the link by generating a SIR target value by means of running an outer loop power control, which SIR target value is used for generating a power adjustment command to be sent to the second node for adjusting the transmission power such that a power level adequate for providing the quality target of the link is achieved. The method comprises the step of detecting an abrupt change in the conditions of the radio signals received from the second node, generating a temporary SIR target value, and replacing the SIR target value generated by the outer loop power control with the temporary SIR target value when generating the power adjustment command to be sent to the second node for adjusting the transmission power.

21 Claims, 4 Drawing Sheets

U.S. PATENT DOCUMENTS

| | | | |
|---|---|---|---|
| 7,570,970 B2 * | 8/2009 | Duan et al. | 455/522 |
| 2002/0001292 A1 * | 1/2002 | Miyamoto | 370/335 |
| 2003/0092463 A1 * | 5/2003 | Charriere et al. | 455/522 |
| 2003/0194002 A1 * | 10/2003 | Corless et al. | 375/229 |
| 2004/0043783 A1 * | 3/2004 | Anderson | 455/522 |
| 2004/0066795 A1 * | 4/2004 | Zhang | 370/442 |
| 2006/0165032 A1 * | 7/2006 | Hamalainen et al. | 370/328 |
| 2008/0207251 A1 * | 8/2008 | Anderson | 455/522 |
| 2010/0081469 A1 * | 4/2010 | Kazmi et al. | 455/522 |
| 2011/0219283 A1 * | 9/2011 | Myers et al. | 714/758 |

OTHER PUBLICATIONS

Mehta, N. et al. "Analysis and Results for the Orthogonality Factor in WCDMA Downlinks." IEEE Transactions on Wireless Communications, vol. 2, No. 6, Nov. 2003, pp. 1138-1149.

* cited by examiner

MULTI MODE OUTER LOOP POWER CONTROL IN A WIRELESS NETWORK

TECHNICAL FIELD

The present invention relates to methods and arrangements in a communication system, in particular to methods and arrangements for adjusting the transmission power of radio signals sent over a radio link in a radio communication system.

BACKGROUND OF THE INVENTION

In communication systems based on e.g. Code Divisional Multiple Access (CDMA), outer loop power control is used to meet the desired quality of service targets. The outer loop power control is implemented both in the user equipment to meet the downlink quality target and also in the base station to meet the uplink quality target. In Cellular Networks, the downlink is the transmission path from the base station to the user equipment, and the uplink is the transmission path from the user equipment to the base station. It is important that the outer loop power control is able to maintain the desired quality of service target despite varying radio conditions, which is often the case in cellular systems.

The following describes various technical aspects related to inner loop power control, outer loop power control and its convergence in CDMA systems. Some specific details are related to Wideband Code Division Multiple Access (WCDMA) but are equally applicable to other CDMA based technologies such as e.g. cdma2000 because power control, both inner and outer loop, is the hallmark of CDMA access technology. The methods may also be implemented in a Fraction High Speed Downlink Packet Data Access (F-HSDPA).

In CDMA systems the inner loop power control, also called fast power control, runs every time slot, which is typically less than 1 ms (e.g. 0.67 ms in WCDMA). In WCDMA the inner loop power control runs in both uplink and downlink. The aim of the uplink and downlink inner loop power controls is to counter the effect of fast fading, while maintaining the desired Signal to Interference and noise Ratio (SIR) target. In the uplink it also ensures to compensate for the near-far problem, so that the signal received from the users far out in the cell are not swamped out by the stronger signal. During every slot the User Equipment estimates the SIR on some known reference or pilot symbols and compares it with some SIR target corresponding to the given service (e.g. certain BLock Error Rate (BLER) requirements, spreading factor used etc.). In WCDMA, Downlink SIR is measured on Dedicated Physical Control Channel (DPCCH), which comprises pilots and Transmitter Power Control (TPC) commands for uplink power control. If the measured SIR is less than the SIR target then the user equipment generates UP command, otherwise it generates DOWN command; in response the base station will increase (in case of UP) or decrease (in case of DOWN) its downlink transmit power.

The aim of outer loop power control is to maintain a certain link quality in terms of Frame Error Ratio (FER), BLock Error Ratio (BLER), Bit Error Rate (BER) or any other suitable measure such as outage probability. The quality target is the ultimate quality target measure, which is set by the network and is expected from the user equipment to consistently maintain this target to ensure the desired quality of service is met throughout the call session. The value of the quality target depends upon the type of service, which in turn impacts the SIR target used for inner loop power control, as explained above. Typically 1% BLER target is used for speech, 10% BLER target is used for packet data, 0.1 BLER % is used for video telephony and so on. Due to the varying radio link conditions e.g. user mobility, fast fading etc, the mapping between the SIR target and BLER changes over time. This is a key point as it requires constant adjustment of the SIR target to maintain the desired value of BLER. This mechanism of adjusting the target SIR is also outer loop power control or quality control.

The most commonly used algorithm used to run outer loop power control is the jump algorithm as depicted below:

$$SIR_t(k+1) = \begin{cases} SIR_t(k) + SIR_s & \text{if block is erroneous} \\ SIR_t(k) - \dfrac{BLER_t}{1 - BLER_t} SIR_s & \text{if block is correct} \end{cases}$$

$SIR_t$ denotes the SIR target, $BLER_t$ is the target block error ratio and $SIR_s$ is the step by which the target SIR is increased in each iteration. The $SIR_s$ is implementation dependent and may typically be 0.5 dB or 1 dB per transport block received.

An important observation is that the increase in SIR target in response to an erroneous block is much larger than the decrease in the SIR target when the block is correctly received. Indeed, the decrease in the SIR target is linked to the BLER target, which is set by the network.

The algorithm is applied to every received transport block in a transport channel after every Transmission Time Interval (TTI), which is typically 20 ms for speech but generally shorter, e.g. 10 ms for packet data. This means that the SIR target is adjusted at least once per TTI. Secondly if there is more than one transport block per TTI per transport channel, which is often the case with services other than speech, the SIR target will be adjusted several times per TTI, i.e. number of times the transport blocks per TTI.

In practice every radio connection or simply radio access bearer comprises several transport channels: at least one Data Transport CHannel (e.g. DTCH) and more than one control signalling channels (e.g. 2 or more Dedicated Control CHannels (DCCH)). Thus, an important characteristic of the outer loop power control is that it should run for each individual transport channel. The SIR target for the inner loop power control, i.e. the final SIR target since there is only one inner loop power control, should be derived from the SIR target obtained from the outer loop power controls of all the transport channels in the radio access bearer. More specifically the SIR target for the inner loop power control should be the maximum of the SIR target values used for the multiple outer loops as expressed in the equation below for N transport channels per radio access bearer:

$$SIR_{t\_innerloop} = \max(SIR_{t\_OL^1}, SIR_{t\_OL^2}, \Lambda, SIR_{t\_OL^N})$$

The main advantage of the outer loop power control algorithm is its robustness and implementation simplicity. But the major limitation is that it is inherently slow because SIR target is changed on TTI level, which is typically in the order of 10 to 20 ms. This should be compared with the situation in the inner loop power control, which runs every time slot, typically less than 1 ms.

The BLER convergence time depends upon the occurrence of block errors events. At low BLER target, e.g. 0.1%, the mean time between the block errors is considerably large. Also, the use of a reference channel with multiple transport blocks per transport channel reduces the average time between the block errors by a factor of the number of blocks. This in turn decreases the BLER convergence time to some extent.

When BLER does not converge or converges too slowly, the main problem is that the user equipment will drive excessive and unnecessary downlink transmitted power resource from the base station. The transmit power is a rare resource, whose inefficient utilisation leads to loss in system capacity.

Different BLER target values will influence the outer loop power control convergence performance. Apparently the initial convergence is the major problem since the initial radio conditions are not well known. However, slow convergence or in some cases unstable outer loop power control behaviour can also occur if there is an abrupt change in the radio conditions. For instance when user equipment is moved from bad to good radio conditions, the SIR target in the latter state (good condition) will remain too high for a considerable amount of time, e.g. few seconds, due to the inherently slow reactive behaviour of the outer loop power control. The overall impact will result in draining the base station radio resources, notably the transmitted power, leading to system throughput loss. This means some specific solution is needed when these type of phenomena occur. The opposite scenario, where user equipment is moved from good radio conditions to the bad radio conditions is less stringent. Since in this case the outer loop power control will quickly lower the SIR target, thereby speed up the convergence.

The jump algorithm used in the outer loop power control may also lead to windup effect especially under heavy load, deep and long shadow fading or in situations when the user equipment is in the cell border region. The windup effect refers to the case when the SIR target increases or decreases indefinitely in one direction. Eventually this will lead to a situation when the downlink transmitted power either hit the maximum transmit power or minimum transmit power values allocated for each channel. This is an unstable behaviour and must therefore be avoided. Therefore, anti-windup protection is implemented in terminals.

The aim is to suspend the outer loop power control, i.e. not to change the SIR target, provided the condition $|SIR_m - SIR_t| \geq \Gamma$ is satisfied $SIR_m$ denotes the estimated value of mean SIR generally measured every frame (10 ms); $\Gamma$ is a threshold margin expressed in dB and is typically 2-4 dB. After the windup situation has vanished the user equipment generally resumes the outer using the last SIR target value, i.e. the value used until the suspension of outer loop. The main problem with the current approach is that it does not address the scenario where radio conditions would change in case the user equipment remains in windup for a long duration.

The convergence of the current outer loop power control is inherently slow as explained above. This means that in case of abrupt changes in the radio signal conditions the outer loop power control reacts with the same pace. Due to slow convergence the system performance in terms of downlink transmit power, is degraded i.e. requires more downlink power in the following scenarios:

During initial convergence of outer loop power control;
During convergence of outer loop power control when radio signal condition changes abruptly,
At present anti-windup, which does not adapt well to fast varying conditions;
During convergence of outer loop power control just after the windup effect.

The adverse performance of the currently used outer loop power control in these scenarios has been discussed within the 3rd Generation Partnership Project (3GPP) whereby state of the art solutions for solving these problems are discussed below.

The initial convergence of outer loop power control can be improved by setting an appropriate initial SIR target at the start of the call or after long inactivity periods. The user equipment specification does not provide any test case that tests the initial convergence of BLER, i.e. the convergence at the start of the call within a certain time. The current requirements on BLER convergence are tested in steady state conditions. A prior-art solution to speed up the initial convergence includes e.g. the following features:

The SIR target is set as the sum of two terms: SIR outage target and SIR BLER target.
The Initial SIR BLER target is the mean of the SIR BLER target used during at least two previous transmissions.
The initial SIR outage target is the mean of the SIR outage target but is slightly higher than the target used in the previous transmission. In addition the initial SIR outage target can also be a value between 80th and 95th percentiles or simply 90th percentile.

However, the above solution has at least two disadvantages: The above solution requires that the network provides two quality targets, target BLER and target outage probability. This will lead to more complexity in the system since the user equipment has to handle two different quality measures to estimate the correct SIR target. It also leads to increased signalling overheads in the downlink due to additional quality target. Another disadvantage is that the initial SIR target setting relies on the averaging of SIR target used in the previous transmissions. At the time of initial SIR target setting either the previous SIR target is not available or it may not be reliable as the radio signalling conditions may have changed.

Further, it has been observed that outer loop power control convergence is slow after an abrupt change in the radio signal conditions. More specifically, when a user equipment moves from bad radio conditions to good radio conditions, the SIR target decreases very slowly i.e. when the user equipment is in good radio conditions. Since the SIR target remains considerably higher than desired, the main impact is that the downlink transmit power will remain high. The specification does not comprise any test cases to ensure functionality in the user equipment that could handle outer loop power control convergence in such a scenario.

It is shown in document EP 1575185 A1 that outage based outer loop power control that relies on a new quality target, outage probability, leads to faster convergence of the outer loop power control. The problem with this solution is that it works in an iterative fashion, based on the Newton-Raphson method requiring intense processing, which eventually drains the user equipment power consumption. It should be noted that each service or connection requires several parallel radio bearers and outer loop power control runs on each radio bearer. Therefore aggregate processing will be significant resulting in much higher user equipment power consumption. Another important aspect is that abrupt changes in radio conditions may not occur extremely frequently, e.g. once every 10-20 seconds depending upon environment. Therefore it is sufficient to have some special mechanism to tackle this situation. It is therefore not appropriate to completely change the currently used and well established outer loop power control methodology to solve one particular issue.

When a windup situation is detected, an anti-windup algorithm is activated to prevent an indefinite change in the SIR target in one direction. In other words, the outer loop power control is suspended until the end of the windup situation. The duration of the windup can vary depending on the fading and shadowing effects. When the windup situation is finished the user equipment restarts with the last value of the SIR target. However, one major problem is that during the windup the radio conditions may change considerably and therefore the old SIR may not be valid any more.

SUMMARY OF THE INVENTION

It is therefore an object of the present invention to provide a mechanism in a radio network node that decreases the transmission power consumption and optimizes the capacity in a radio communication system.

The object is achieved by a method in a first node for adjusting the transmission power of radio signals sent over a radio link from a second node to be received by the first node. The first node maintains a quality target of the link by generating a SIR target value by means of running an outer loop power control. The SIR target value is used for generating a power adjustment command to be sent to the second node for adjusting the transmission power such that a power level adequate for providing the quality target of the link is achieved. The method and arrangement comprises the steps of detecting an abrupt change in the conditions of the radio signals received from the second node, generating a temporary SIR target value, and replacing the SIR target value generated by the outer loop power control with the temporary SIR target value when generating the power adjustment command to be sent to the second node for adjusting the transmission power.

In accordance with the present invention, the object is also achieved by an arrangement in a first node for adjusting the transmission power of radio signals sent over a radio link from a second node to be received by the first node. The first node is adapted to maintain a quality target of the link by generating a SIR target value. The SIR target value is generated by means of running an outer loop power control. The SIR target value is used for generating a power adjustment command. The generated power adjustment command is sent to the second node for adjusting the transmission power such that a power level adequate for providing the quality target of the link is achieved. The first node arrangement comprises a detecting unit, adapted to detect an abrupt change in the conditions of the radio signals received from the second node. The first node arrangement also comprises a generating unit, adapted to generate a temporary SIR target value. The first node arrangement further comprises a replacement unit, adapted to replace the SIR target value generated by the outer loop power control with the temporary SIR target value when generating the power adjustment command to be sent to the second node for adjusting the transmission power.

In accordance with the present invention, the object is also achieved by a method in a second node for adjusting the transmission power of radio signals sent over a radio link to be received by a first node. A power adjustment command is received from the first node for adjusting the transmission power such that a power level adequate for achieving a predetermined quality target of the link is reached. The power of the transmitted signals has a certain maximum limit and a certain minimum limit. The method is characterized by the steps of detecting an abrupt change in the conditions of the radio signals when a power adjustment command to increase the power is received from the first node and the maximum limit of the power of the transmitted signals is reached. An abrupt change in the conditions of the radio signals may also be detected when a power adjustment command to decrease the power is received from the first node and the minimum limit of the power of the transmitted signals is reached.

In accordance with the present invention, the object is also achieved by an arrangement in a second node for adjusting the transmission power of radio signals sent over a radio link to be received by the first node. The arrangement in the second node comprises a receiving unit adapted to receive a power adjustment command from the first node for adjusting the transmission power such that a power level adequate for achieving a predetermined quality target of the link. The power of the transmitted signals has a certain maximum and minimum value. The second node arrangement comprises a detection unit adapted to detect an abrupt change in the conditions of the radio signals received from the first node.

Since the user equipment detects if an abrupt change in the conditions of the radio signals received from the base station has occurred and, when an abrupt change is detected, starts to generate temporary SIR target values and replace the SIR target values generated by the normal outer loop power control, a faster convergence of the SIR target values is achieved, which reduces power consumption.

Thus an advantage of the present method and arrangement is that a fast initial convergence of the outer loop power control is achieved, thus conserving downlink and uplink transmit power.

DETAILED DESCRIPTION OF PREFERRED EMBODIMENTS

The invention is defined as a method and an arrangement which may be put into practice in the embodiments described below.

Figure 1:
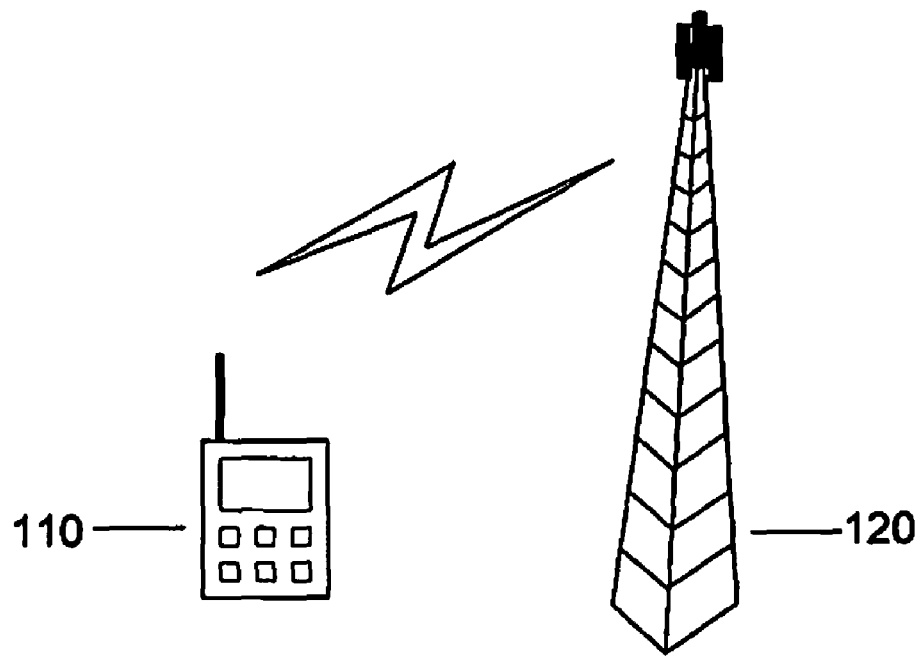
FIG. 1 is a schematic illustration over a radio access network according to the present methods.

FIG. 1 depicts a first node 110 communicating with a second node 120 in a radio communication system.

In some embodiments, the first node 110 may be a user equipment such as a mobile cellular radiotelephone, a Personal Digital Assistant (PDA), a laptop, a computer or any other kind of device capable of communicate radio resources, and the second node 120 a base station, a wireless communications station, a fixed station, a control station, a repeater or any similar arrangement for radio communication.

However, the situation may as well be the opposite, such as in some other embodiments, wherein the first node 110 may be a base station, a wireless communications station, a fixed station, a control station, a repeater or a similar arrangement for radio communication, and the second node 120 is a user equipment such as a mobile cellular radiotelephone, a PDA, a laptop, a computer or any other kind of device capable of communicate radio resources.

However, in this text the term user equipment 110 will be used for the first node 110 and the term base station 120 will be used for the second node 120 in order to facilitate the comprehension of the present method.

The radio communication system is based on technologies such as e.g. Code division multiple access (CDMA), Wideband Code Division Multiple Access (WCDMA), CDMA 2000, High Speed Downlink Packet Data Access (HSDPA), High Data Rate (HDR) etc.

Radio signals are sent from the base station 120 over a radio link and are received by the user equipment 110. The power of the signal, which may be too high or too low to be suitable for the user equipment 110, is adjustable by the user equipment 110 by e.g. running an inner loop power control, also called fast power control. The inner loop power control may run every time slot of a radio frame and is typically less than 1 ms. In WCDMA, the inner loop power control is typically run each $1/15$ of the frame, e.g. 0.67 ms when the frame is 10 ms. The inner loop power control may run in both on signals sent from the user equipment 110 to the base station 120, i.e. uplink signals, and from the base station 120 to the user equipment 110, i.e. downlink signals. The aim of the uplink and downlink inner loop power controls are inter alia to counter the effect of fast fading, while maintaining a desired SIR target. It also ensures to compensate for the near-far problem, so that a signal received from users far out in the cell are not swamped out by a stronger signal.

The user equipment 110 estimates a SIR value e.g. on some known pilot symbols and compares it with some SIR target corresponding to a given quality of service target e.g. certain BLER requirements, spreading factor used etc.

In e.g. WCDMA, downlink SIR is measured on dedicated physical control channel (DPCCH), which DPCCH comprises pilots and TPC commands for uplink power control. If the measured SIR is less than SIR target then the inner loop power control at the user equipment 110 generates UP command and sends it to the base station 120, and if the measured SIR is more than SIR target then the inner loop power control at the user equipment 110 generates DOWN command and sends it to the base station 120. In response, the base station 120 will increase, in case of UP command, or decrease, in case of DOWN command, its downlink transmit power.

An outer loop power control is used by the user equipment 110 or the base station 120 to meet the desired quality of service targets. The outer loop power control may be implemented both in the user equipment 110 to meet the downlink quality target and in the base station 120 to meet the uplink quality target. It is important that despite varying radio conditions, which is often the case in cellular systems, the outer loop is able to maintain the desired quality of service target.

The outer loop power control may be used to maintain a certain link quality in terms of e.g. Frame Error Ratio (FER), BLock Error Ratio (BLER), Bit Error Ratio (BER) or any other suitable measure such as outage probability. Thus the quality target used according to the present method may be based on block or frame error rate, where the block or frame error rate is measured using e.g. Cyclic Redundancy Check (CRC).

However, the quality target may also in some embodiments of the present methods be based on TPC command error and the corresponding downlink quality may be measured on received TPC commands.

The quality target may be set by the network and it is expected from the user equipment 110 to consistently maintain this target to ensure the desired quality of service is met throughout the call session. The value of the quality target depends upon the type of service, such as speech, packet data, video data etc, which in turn impacts the SIR target used for inner loop power control. Thus, an adequate power level for providing the quality target of the radio link is easily achieved, during normal signal radio signal conditions.

When radio conditions change abruptly, there may be an advantage to apply a suitable correction to the SIR target before resuming the normal outer loop power control operation. Some typical scenarios where abrupt changes in the radio signal conditions considerably degrade the network performance are changes from bad to good radio conditions, windup conditions, or the convergence of SIR target after windup.

The windup condition is an unstable scenario in which the SIR target either increases or decreases in one direction. This situation occurs either when radio signal conditions become consistently too good or too bad. In the former case the SIR target is decreased. But in the latter scenario the SIR target is increased due to consecutive block errors. The windup situation leads to large difference between the measured SIR and the SIR target.

When the user equipment 110 moves from bad to good radio signal conditions, the SIR target has to be decreased rapidly, but inherently the outer loop power control tends to decrease the SIR target at a much slower rate. This means that the measured SIR may be smaller than the SIR target for a considerable amount of time and thereby it might drive down the transmitted carrier power.

As stated above the windup is an unstable condition, which requires constant monitoring and preventive actions, so called anti-windup. Windup can happen in both directions because the outer loop power control is used in uplink and downlink in e.g. CDMA systems. Delays and inaccurate detection of a windup situation significantly degrade the link performance on both uplink and downlink. This is because due to large difference between the measured SIR and target SIR, the inner loop power control will take longer to stabilize after the end of the windup conditions. The main purpose of detecting windup and activating anti-windup is to limit indefinite or unnecessary increases or decreases of the SIR target. In particular, the anti-windup may be activated when the transmitted radio signal power from the base station 120 to be received by the user equipment 110 reaches its minimum or maximum threshold values.

After the end of a detected windup condition, it is an advantage to achieve a fast convergence of the measured SIR value with the SIR target value in order to optimize the use of the resources in the network.

Figure 2:
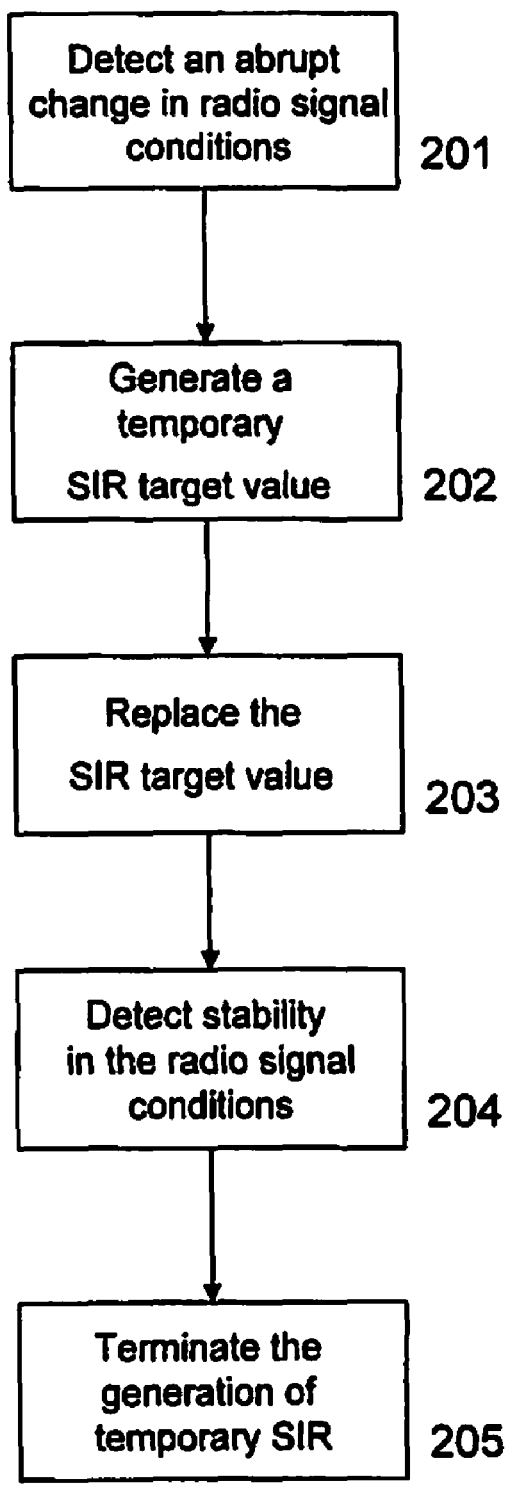
FIG. 2 is a flow chart illustrating a method in a first node for adjusting the transmission power of radio signals sent over a radio link from a second node.

FIG. 2 is a flowchart illustrating a method in a user equipment 110 for adjusting the transmission power of radio signals sent over a radio link from a second node 120 to be received by the user equipment 110. To appropriately adjust the SIR target after an abrupt change, the method comprises the steps of:

Step 201

The user equipment 110 detects an abrupt change in the conditions of the radio signals received from the base station 120.

When the abrupt change in radio signal conditions is a change in conditions from bad to good, these may be detected when the measured difference in averaged received power ($P_r$) within a measurement period exceeds a predetermined threshold value ($\delta$). This may be performed e.g. by measuring on the downlink physical channel e.g. DPCCH, CPICH or both, by the user equipment 110 using the detection algorithm:

$$P_r(t) - P_r(t-1) \geq \delta \text{ [dB]}$$

An advantage of the described detection mechanism is that it is relatively easy to implement.

When the abrupt change in radio signal conditions is a change in conditions from bad to good, these may alternatively be detected when the difference in averaged measured orthogonality ($\alpha_m$) within a measurement period falls below a predetermined threshold value (θ). This may be the downlink orthogonality ($\alpha_m$) measured on the received radio signal by the user equipment 110. The orthogonality measurement depicts the channel dispersive behaviour in time. The orthogonality ($\alpha_m$) will be worse in bad radio conditions, i.e. larger delay spread in more dispersive environment. In this document larger value of $\alpha_m$ would imply worse channel condition or in other words more dispersive channel. Consequently, the described measure is more reliable than the detection based on measuring the received power. The detection may be performed by using the detection algorithm:

$$\alpha_m(t)-\alpha_m(t-1)\leq\theta$$

In yet another embodiment, the detection of an abrupt change in the conditions of the radio signals received from the base station 120 may be made by combining the two previously made detection mechanisms in order to achieve a higher degree of accuracy.

The abrupt change in radio signal conditions is in this embodiment detected when the measured difference in averaged received power within a measurement period exceeds a predetermined threshold value and the difference in averaged measured orthogonality within a measurement period falls below a predetermined second threshold value. Such a combined detection mechanism may be based on a variant of the following detection algorithm:

$$\alpha_m(t)-\alpha_m(t-1)\leq\theta \text{ AND } P_r(t)-P_r(t-1)\geq\delta \text{ [dB]}$$

The above described detection mechanisms for detecting bad to good conditions, provide a trade-off between accuracy and complexity. It should be noted that also other relative measures exists, such as DPCCH/CPICH SIR. These are, although possible to use within the present method, some of them to some extent less reliable since SIR may not change significantly.

When the abrupt change in radio signal conditions is a windup situation, this may be detected when the user equipment 110 measure that a maximum or minimum power limit of the signal from the base station 120 is reached. The maximum and minimum power limit of the signal from the base station 120 may previously have been sent from the base station 120 to the user equipment 110. Such sending of information data concerning the maximum and minimum power limits for a given service may be made at call setup, or at any other convenient moment. The described detection may be further illustrated by the algorithm:

$$P_r(t)=P_{max} \text{ OR } P_r(t)=P_{min}$$

Where $P_r(t)$ is the received power at the user equipment 110, $P_{max}$ is the received power level measured at the user equipment 110 when the base station send radio signals on the maximum power limit and $P_{min}$ is the received power level measured at the user equipment 110 when the base station send radio signals on the minimum power limit.

In some embodiments, the abrupt change in radio signal conditions may be detected when the difference between the number of generated power control commands for increasing and decreasing the transmission power at the second node respectively, exceeds a predetermined threshold value within a certain time period, without achieving said link quality target at the user equipment 110. The user equipment 110 thus may make an estimation either implicitly or explicitly whether the downlink transmission power thresholds, the maximum or minimum power limits, are reached or not at the base station 120. Such estimation may be based on TPC commands statistics. At the user equipment 110, the inner loop power control iteratively generates TPC commands e.g. every time slot, as previously explained. The transmitted TPC commands may be a TPC UP command for increasing the downlink transmission power at the base station 120 or a TPC DOWN command for decreasing the downlink transmission power at the base station 120, depending on the result of the comparison between the measured SIR value and the SIR target value. If the measured SIR value is lower than the SIR target value, a TPC UP command is sent to the base station 120 and vice versa. However, by making statistics at the user equipment 110 on the number of the transmitted TPC commands, a windup situation may be detected.

If the difference between the number of TPC UP commands and TPC DOWN commands in a certain period ($T_p$), exceeds a certain threshold value ($\gamma$) and if the received blocks are still erroneous, it indicates that the maximum or minimum downlink link power is most likely reached, and it could be assumed that a windup situation has occurred. E.g. if the number of TPC UP commands exceeds the number of TPC DOWN commands with e.g. 30 or 40 within a certain period ($T_p$) e.g. 60 ms, or 3 TTI for speech, and if the received blocks are still erroneous, it may indicate that the maximum downlink link power is most likely reached, which is likely to indicate that a windup situation has occurred, as expressed e.g. in the following equation:

$$|TPC\_Up\_Total|-|TPC\_Down\_Total|\geq\gamma$$

AND received blocks erroneous

Where TPC_Down_Total and TPC_Up_Total are the total number of TPC Down and UP commands respectively, received during the period ($T_p$) and $\gamma$ is a threshold value.

And, vice versa: If the difference between the number of TPC DOWN commands exceeds the number of TPC UP commands with e.g. 30 or 40 within a certain period ($T_p$) e.g. 60 ms, or 3 TTI for speech, and if the received blocks remain error free, it indicates that the minimum downlink link power is most likely reached, which is likely to indicate that a windup situation has occurred.

It may be noted that windup occurring due to downlink maximum power limit is more critical than windup due to downlink minimum power limit, why an anti-windup scheme with certain advantage is focused on detecting and combating windup situations where the maximum downlink power limit is reached.

In some embodiments, the abrupt change in radio signal conditions may be detected, in addition to the above mentioned detection algorithm, by also measuring the received power of the radio signals from the base station 120. This may be performed by the user equipment 110, for example by measuring on the downlink physical channel such as e.g. DPCCH, CPICH or both. If the difference in averaged received power ($P_r$) between a number of consecutive transmission periods remain within a predetermined threshold value ($\delta$), in addition to the previously described conditions, a windup situation due to maximum downlink power limit may be detected. This may be illustrated e.g. by the formula:

$$|TPC\_Up\_Total|-|TPC\_Down\_Total|\geq\gamma$$

AND received blocks erroneous

AND $P_r(t)-P_r(t-1)\geq\delta$ [dB]

Where TPC_Down_Total and TPC_Up_Total are the total number of TPC Down and UP commands respectively, received during the period ($T_p$) and $\gamma$ is a threshold value. $P_r(t)$ is the received power at the user equipment 110 at the iteration t and $\delta$ is a second predefined threshold value.

For example, if the received transmitted radio signal power at the user equipment 110 e.g. on DPCCH does not change or remains within a limit over a period e.g. 2 or 3 TTI and the user equipment 110 has sent more UP commands than DOWN commands by a certain threshold value e.g. 30 or 40 but received blocks are still in error, then a windup situation may be detected. An advantage of the present method and arrangement is that a better and more accurate detection of a windup situation is possible.

Step 202

When an abrupt change in radio signal conditions has been detected as described in step 201, corrective measures are introduced to immediately set the SIR target to a value, which would ensure faster convergence of the outer loop power control by quickly generating block errors in a controlled way. In this step 202 the user equipment 110 generates a temporary SIR target value.

The generation of a temporary SIR target value may be made in a plurality of ways when an abrupt change from bad to good radio signal conditions has been detected. In some embodiments of the method, the step of generating a temporary SIR target value may be performed by setting the temporary SIR target value to a predetermined value corresponding to the detected radio signal conditions, such as the radio link quality.

According to this embodiment, the SIR target may be set to a predefined value corresponding to the target BLER or any other appropriate link quality measure. The predefined values may be implemented, e.g., in the form of a look up table, which in turn may be based on previously made simulation results, such as e.g. SIR Additive White Gaussian Noise (AWGN) values or initial SIR target values for target BLER values. The aim of the generation of temporary SIR target values is to immediately set the SIR target to a value, which would ensure faster convergence of the outer loop power control by quickly generating block errors in a controlled way.

In some embodiments of the method, the steps of generating a temporary SIR target value is performed by an outer loop power control that uses a dynamic SIR target step size, where the said SIR target step size is progressively increased until when the measured link quality error state is altered from "correct" to "erroneous", e.g. the occurrence of block error in case BLER is used as link quality measurement.

In this embodiment, any commonly known algorithm used for outer loop power control may be used e.g. the previously explained jump algorithm may be used, but with the important change that the SIR target step size, which is one of the input parameters to the outer loop power control algorithm, is dynamically increased for each iteration. This may help adjusting the SIR target in a controlled manner more quickly than when a static SIR target step size is used, which improves the radio propagation performance.

As an example, the starting temporary SIR step size may be e.g. between 0.25 or 1 dB. The temporary SIR target is then changed by the outer loop power control by progressively increasing the SIR target step e.g. by 0.25 or 0.5 dB. This method may be illustrated e.g. by the following algorithm:

$$\text{SIR}_t \text{ step size}(i+1) = \text{SIR}_t \text{ step size}(i) + n \cdot k \cdot i$$

Where k may be an arbitrary number, n is the initial step size, i is an ordinal and $\text{SIR}_t$ step size is the step size used for altering SIR target between each iteration.

Thus the temporary SIR target values may be generated repeatedly in a loop process by firstly set the temporary SIR target to the last SIR target value, which last SIR target value were generated by the normal outer loop power control when the abrupt change from bad to good radio signal conditions were detected. Then, the outer loop power control iteratively adjusts the temporary SIR target value while using a dynamic SIR target step size, which is increased progressively for each iteration, until block errors occur on the radio signal received from the base station 120.

E.g. if the SIR target step size at the moment when the abrupt change from bad to good propagation conditions were detected in step 201 is 1 dB, the first temporary SIR target step size for i=0 is set to 1 dB. The initial step size n may be previously set to e.g. 0.25 dB. The next iterated temporary SIR target step size for i=1 may then be set to 1+0.25=1.25 (dB). If still no block errors occur on the received radio signal, the iterative generation of temporary SIR target step size value continues, e.g. SIR target step set to 1.25+0.25=1.5 (dB). This process continues until the occurrence of block errors.

In this way, the process of adjusting the transmission power at the base station 120 such that a power level adequate for providing the quality target of the link may be achieved faster than by using the step size of the normal outer loop power control, which saves resources and optimizes the system.

In yet some embodiments of the method, the step of generating a temporary SIR target value is performed by an outer loop power control that uses an SIR target step size, where the step size is proportional to the magnitude of the change in radio signal conditions. Accordingly, the temporary SIR target value is increased or decreased with a step size proportional to the magnitude of the change in radio signal conditions for each iteration in the outer loop power control.

Thus the step size is a function of change in received power ($P_r$) and/or measured orthogonality ($\alpha_m$) so that a big change in e.g. received power ($P_r$) corresponds to a large SIR target step size etc. This may be implemented e.g. in form of a look up table. Some alternative algorithms for performing the generation of temporary SIR target step size values may be:

$$\text{SIR}_t \text{ step size}(i+1) = \text{SIR}_t \text{ step size}(i) + n \cdot f(P_r) \, n = 1, 2, \ldots, \infty$$

or $$\text{SIR}_t \text{ step size}(i+1) = \text{SIR}_t \text{ step size}(i) + n \cdot f(\alpha_m) \, n = 1, 2, \ldots, \infty$$

or $$\text{SIR}_t \text{ step size}(i+1) = \text{SIR}_t \text{ step size}(i) + n \cdot f(P_r, \alpha_m) \, n = 1, 2, \ldots, \infty$$

Where n may be an arbitrary number, i is an ordinal and $\text{SIR}_t$ step size is the step size used for altering SIR target between each iteration.

After setting the new temporary SIR target, the normal outer loop power control with the normal SIR target step size may be started, according to some embodiments. Alternatively, progressively higher SIR target step sizes from the look table may be selected until block error occurs before the normal outer loop power control is resumed, i.e. setting the SIR target value according to the normal outer loop power control scheme.

In yet some embodiments of the present method, the step of generating a temporary SIR target value is performed by setting the temporary SIR target value to the SIR target value generated by the outer loop power control, which where used when the abrupt change in radio signal conditions where detected. This alternative may be used with particular advantage when a windup situation has been detected. Thus:

$$\text{TempSIR}_t = \text{SIR}_t$$

No more SIR target values generated by the outer loop power control are required as input values to the inner loop power control. By disengaging the outer loop power control, an unnecessary increase or decrease of SIR target is avoided.

Step 203

When a temporary SIR target value is generated as described under step 202, the SIR target value generated by the outer loop power control is replaced with the temporary SIR target value when generating the power adjustment command to be sent to the second node 120 for adjusting the transmission power. The outer loop power control may however be suspended or may, according to some embodiments, continue to compute and generate SIR target values, but they are not used as input values to the inner loop power control. The outer loop power control may also according to some embodiments be used but with a dynamic step size as previously explained.

Step 204

When no abrupt change in radio signal conditions or windup situation is present anymore, there may be no further advantage to continue using the temporary SIR target generated according to the present method. The reason for this is that the jump algorithm used in the normal outer loop power control, due to e.g. its robustness and implementation simplicity, works well for generating SIR target values during stable radio signal conditions. The temporary SIR target value may advantageously be used just temporary, during exceptional, abruptly fluctuating radio signal conditions.

The conditions of the radio signals received from the base station 120 are continuously monitored, also during the time period for which the SIR target value generated by the normal outer loop power control is not used by the inner loop power control.

Thus, the detection of a stability in the conditions of the radio signals received from the base station 120 may be the starting shot for returning to use the SIR target values generated by the normal outer loop power control.

The stability in the conditions of the radio signals received from the base station 120 may be detected by monitoring on every frame level. In other words, the measurement samples are averaged over one or more frames and compared with the measurement results in the previous frame or frames. The stable radio signal conditions may for instance be detected by measuring the received power ($P_r$) on the downlink physical channel e.g. DPCCH, CPICH or both, by the user equipment 110 using e.g. the detection algorithm:

$$P_r(t)-P_r(t-1)<\delta \text{ [dB]}$$

Thus a stability in radio signal conditions may be detected when the measured difference in averaged received power ($P_r$) within a measurement period remains within a predetermined threshold value ($\delta$). This embodiment of the detection mechanism has the advantage of being relatively easy to implement.

In some embodiments, stable radio signal conditions may alternatively be detected when the difference in averaged measured orthogonality ($\alpha_m$) within a certain measurement period remains within a predetermined threshold value ($\theta$). This may be performed by using the detection algorithm:

$$\alpha_m(t)-\alpha_m(t-1)>\theta$$

The latter measure is more reliable than the detection mechanism based on measuring the received power.

In some embodiments, stable radio signal conditions may be detected by combining the above two previously made detection mechanisms in order to achieve a higher degree of accuracy. Such a combined detection mechanism may be based on a variant of the following formula:

$$\alpha_m(t)-\alpha_m(t-1)>\theta \text{ AND } P_r(t)-P_r(t-1)<\delta \text{ [dB]}$$

In yet some other embodiments that may be used with certain advantage e.g. after the event of a windup situation, stable radio signal conditions may be detected when the user equipment 110 detects that a maximum or minimum power limit of the signal from the base station 120 is not reached. Thus the averaged received power ($P_r$) of the radio signals from the base station over a certain time period ($T_a$) has to be higher than a received minimum power limit ($P_{min}$), corresponding to when the base station 120 send radio signals at a minimum power limit, and at the same time lower than a received maximum power limit ($P_{max}$), corresponding to when the base station 120 send radio signals at a maximum power limit of the signal from the base station 120. Thus, normal outer loop power control is resumed.

Information data concerning the value of the maximum and minimum power limits of the signal to be used for transmission from the base station 120 may previously have been sent from the base station 120 to the user equipment 110. Such sending of information data concerning the maximum and minimum power limits for a given service may be made at call setup, or at any other convenient moment.

In some embodiments, stable radio signal conditions of the radio signals received from the base station 120 may be detected when the difference between the number of generated power control commands for increasing and decreasing the transmission power at the base station 120 respectively, is below a predetermined threshold value ($\gamma$) and the link quality target is achieved. This is e.g. illustrated in the algorithm:

$$|\text{TPC\_Up\_Total}|-|\text{TPC\_Down\_Total}|<\gamma \text{ AND}$$
received blocks correct Where TPC_Up_Total is the number of TPC up commands sent within a certain time period, TPC_Down_Total is the number of TPC Down commands sent within the same certain time period and $\gamma$ is a predefined threshold value.

If the difference between the number of TPC UP commands and TPC DOWN commands within a certain measurement period fall below a predefined threshold value $\gamma$ and if the received blocks are correct, it may be assumed that the radio signal conditions are stable. E.g. if the number of TPC UP commands fall below the number of TPC DOWN commands with e.g. 30 or 40 within a certain period e.g. 60 ms, or 3 TTI for speech, and if the received blocks are without errors, it indicates that the radio signal conditions are stable and that the normal outer loop power control with advantage may be assumed.

In some embodiments, stable radio signal conditions of the radio signals received from the base station 120 may be detected when, in addition to any of the above mentioned detection methods, a certain quarantine period ($\epsilon$) has been passed after the detection of the windup. Thus stable radio signal conditions may be assumed e.g. by detecting that the power of the transmitted signals from the second node 120 to the first node 110 is within a certain limit and a certain period of time ($\epsilon$) has passed after the abrupt change in radio signal conditions has been detected. This may be illuminated through the algorithm:

$$|\text{TPC\_Up\_Total}|-|\text{TPC\_Down\_Total}|<\gamma$$

AND received blocks correct

AND $t<\epsilon$

Where TPC_Up Total is the number of TPC up commands sent within a certain time period (t), TPC_Down_Total is the number of TPC Down commands sent within the same certain time period (t), t is a certain time period that has passed since an abrupt change in radio signal conditions has been detected, γ is a predefined threshold value and ϵ is a predefined quarantine period.

According to some of the previously described embodiments of the step 202, of generating temporary SIR target values, new temporary SIR target values are repeatedly generated in a loop process until a certain predefined condition concerning the link quality is achieved. Thereafter, stable conditions of the radio signals received from the base station 120 are assumed and the iterative generation of new temporary SIR targets terminates. As an example, a stability in the conditions of the radio signals received from the second node 120, comprise detecting when the measured link quality error state is altered from "correct" to "erroneous" or vice versa.

In some embodiments, other ways of detecting stability in the conditions of the radio signals received from the base station 120 may be used.

Step 205

In this step 205, the user equipment 110 may terminate the generation of temporary SIR target values. This may be performed when stable conditions of the radio signals received from the base station 120 are detected.

Step 206

The step 206 of resuming the use of SIR target values generated by the normal outer loop power control may be performed when stability in the conditions of the radio signals received from the base station 120, has been detected.

When the resuming is to be performed after an abrupt change from bad to good radio signal conditions, the use of SIR target values generated by the normal outer loop power control may be resumed e.g. when the generation of temporary SIR target values or temporary SIR target progressive step size is terminated. Resuming the use of SIR target values generated by the normal outer loop power control may alternatively be made when stable radio signal conditions has been detected.

To achieve fast convergence when the resuming is to be performed after a windup situation has occurred, corrective action may with certain advantage be taken. In case the period of windup exceeds a certain predefined threshold time ($T_t$), it may be assumed that the radio signal conditions have changed during the windup period ($T_w$). Thus it may not be appropriate to restart the outer loop power control using the old SIR target value that was used until the suspension of the outer loop power control when the windup where detected.

In order to set an appropriate SIR target value as a starting value for the outer loop power control, according to some embodiments of the invention, the user equipment 110 measures SIR and compute an average value of the measured SIR values over the windup period ($T_w$). When the windup situation is dissolved, a comparison may be made between the length of the windup period ($T_w$) and the predefined threshold time ($T_t$). If the windup period ($T_w$) exceeds the predefined threshold time ($T_t$), the SIR target may be set to the computed average measured SIR value during the windup period ($T_w$).

For example, if the outer loop power control is suspended for 30 ms or more, the outer loop power control is resumed by setting SIR target to the average measured SIR during 30 ms. Otherwise it is resumed with the last used SIR target.

Thus the step of resuming the use of SIR target values generated by the outer loop power control may further comprise measuring the SIR over the entire time period for which the outer loop power control is suspended ($T_w$) and calculating an average value of the SIR and, if said time period ($T_w$) exceeds a certain time duration ($T_t$) at the moment when the use of SIR target values is resumed, the temporary SIR target is set to the measured SIR averaged over said time period ($T_w$). The averaging may be linear or non linear or may be based on any other suitable averaging method such as moving average etc. An example of simple linear averaging is as follows:

if $T_w > T_t$ then $$TempSIR_t = \frac{SIR_1 + SIR_2 + \ldots + SIR_n}{n}$$

Where Temp $SIR_t$ is the temporary SIR target, n is the number of measured SIR values during the windup period ($T_w$), and $T_t$ is a threshold value. Each SIR value may be measured over one time slot duration to allow fast power control, which operates on time slot level. E.g. a WCDMA frame, which is 10 ms long, contains 15 time slots.

In yet some other embodiments, the step of resuming the use of SIR target values generated by the outer loop power control may further comprise the step of setting the first SIR target value to a predetermined value corresponding to the received link quality, if the time period ($T_w$) for which the outer loop power control is suspended exceeds a certain time duration ($T_t$) at the moment when the use of SIR target values generated by the outer loop power control is resumed.

Thus, in order to set an appropriate SIR target value as a starting value for the outer loop power control, according to some embodiments of the invention, if the windup period ($T_w$) exceeds a certain threshold value ($T_t$), the temporary SIR target is set to a predetermined value, depending on the link quality value, e.g. the BLER value.

For example, if the outer loop power control is suspended for 30 ms or more and the BLER target is set to 10%, the outer loop power control is resumed by setting the SIR target to the SIR target value, corresponding to 10% BLER. Otherwise, if the outer loop power control is suspended for less than 30 ms, the outer loop power control is resumed with the last used SIR target.

When the windup situation is dissolved, a comparison may be made between the length of the windup period ($T_w$) and the predefined threshold time ($T_t$). If the windup period ($T_w$) exceeds the predefined threshold time ($T_t$), the SIR target may be set to a predefined value corresponding to the received link quality, such as e.g. the target BLER.

Further, according to this embodiment, the SIR target may be set to a predefined value corresponding to the target BLER or any other appropriate link quality measure. The predefined values may be implemented, e.g., in the form of a look up table, which in turn may be based on previously made simulation results, such as e.g. SIR Additive White Gaussian Noise (AWGN) values or initial SIR target values for target BLER values.

For example if the outer loop power control is suspended for 30 ms or more, the outer loop power control is resumed with the initial SIR target in static radio conditions corresponding to the quality of service. Otherwise it is resumed with the last used SIR target. Thus an advantage of the present method and arrangement, that an appropriate outer loop power control operation, i.e. fast or at least normal convergence of the outer loop power control after the end of windup situation is achieved. Another advantage of the present method and arrangement is that the general network capacity may be improved. Yet another advantage of the present method and arrangement is that it could be used independent of outer loop methodology used in the user equipment, i.e. compatible with the current outer loop power control and can work with a scheme using a different outer loop metric, e.g. outage based.

The description of the present method has focused mainly and by means of example on the downlink outer loop power control in a user equipment. The present method, however, is equally valid for the uplink where the outer loop power control runs solely in the base station in case of single link in a non soft handover scenario. It may also be performed partly in the base station controller or radio network controller when the user equipment is in soft handover. Abrupt variations for radio signal conditions are also experienced and measurable in the uplink. Therefore, the solutions described above can as well be used to speed up the uplink outer loop power control convergence, reduce uplink noise rise and thereby improve uplink capacity.

Also the description in the preceding sections has, by means of example, mainly focused on an outer loop power control, which is based on BLER based quality targets. The BLER is only one commonly used quality target parameter. However, there are other quality target parameters that may be used according to the present method, such as TPC command error rate, which is used for running power control when fractional dedicated physical channel (F-DPCH) is used. F-DPCH is a physical control channel in the downlink comprising only TPC commands and the channel is used only when both data and higher layer control signalling are sent to the user on high speed downlink shared channel (HS-DSCH). The advantage of F-DPCH is the reduction of overheads. The difference between BLER based and TPC command error rate based i.e. with F-DPCH, outer loop power control is only that in the former case the quality is measured on the CRC of the received transport blocks whereas in the latter case the downlink quality is measured on the received TPC commands. This is because F-DPCH does not contain any transport block, where generally the CRC is appended. But the general principle is the same i.e. the inner loop power control should ensure that the desired quality target is met. Similarly functionality such as anti-windup may be used in both cases. Therefore, the invention is equally applicable to the convergence of outer loop power control for F-DPCH i.e. the one using the TPC command error rate based quality target.

Further by means of example and in order to simplify the comprehension, the term SIR has been consistently used in this text when describing a Signal to noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Signal to Interference and Noise Ratio (SINR) or an inversion of the ratio, like Interference to Signal Ratio, (ISR). Any of these or similar ratios may be used in the context of this description instead of the SIR.

Figure 3:
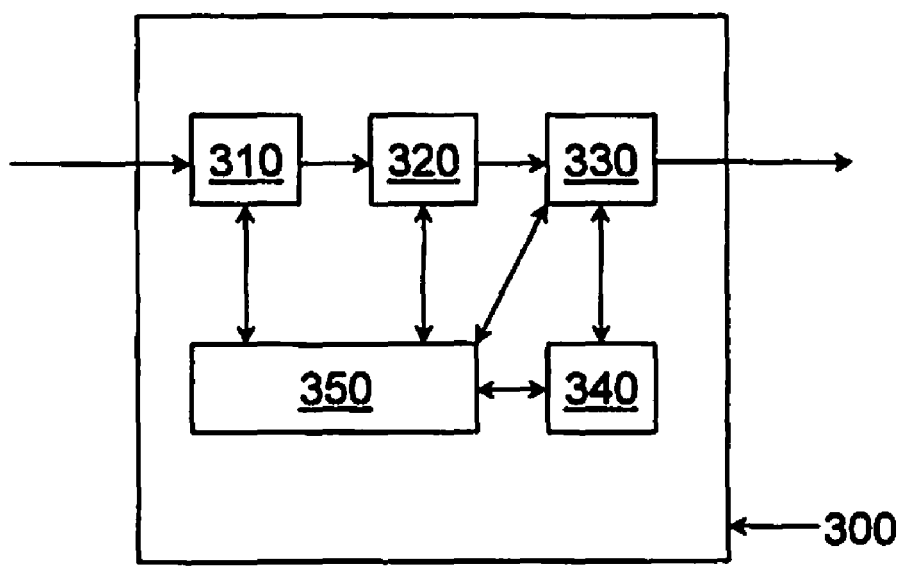
FIG. 3 is a block diagram illustrating an arrangement in a first node for adjusting the transmission power of radio signals sent over a radio link from a second node.

To perform the method steps in the first node 110 for adjusting the transmission power of radio signals sent over a radio link from a second node 120, the first user equipment 110 comprises an arrangement 300 as depicted in FIG. 3. The first node 110 is adapted to maintain a quality target of the link by generating a SIR target value by means of running an outer loop power control. The SIR target value is used for generating a power adjustment command to be sent to the second node 120 for adjusting the transmission power such that a power level adequate for providing the quality target of the link is achieved.

The first node arrangement 300 comprises a detecting unit 310, adapted to detect an abrupt change in the conditions of the radio signals received from the second node 120. The detecting unit 310 may further be adapted to detect stability in the conditions of the radio signals received from the second node 120.

The first node arrangement 300 further comprises a generating unit 320, adapted to generate a temporary SIR target value.

The first node arrangement 300 further comprises a replacement unit 330, adapted to replace the SIR target value generated by the outer loop power control with the temporary SIR target value when generating the power adjustment command to be sent to the second node 120 for adjusting the transmission power.

In some embodiments, the first node arrangement 300 further comprises a resuming unit 340, adapted to terminate the generation of temporary SIR target values, and to resume the use of SIR target values generated by the outer loop power control.

Figure 4:
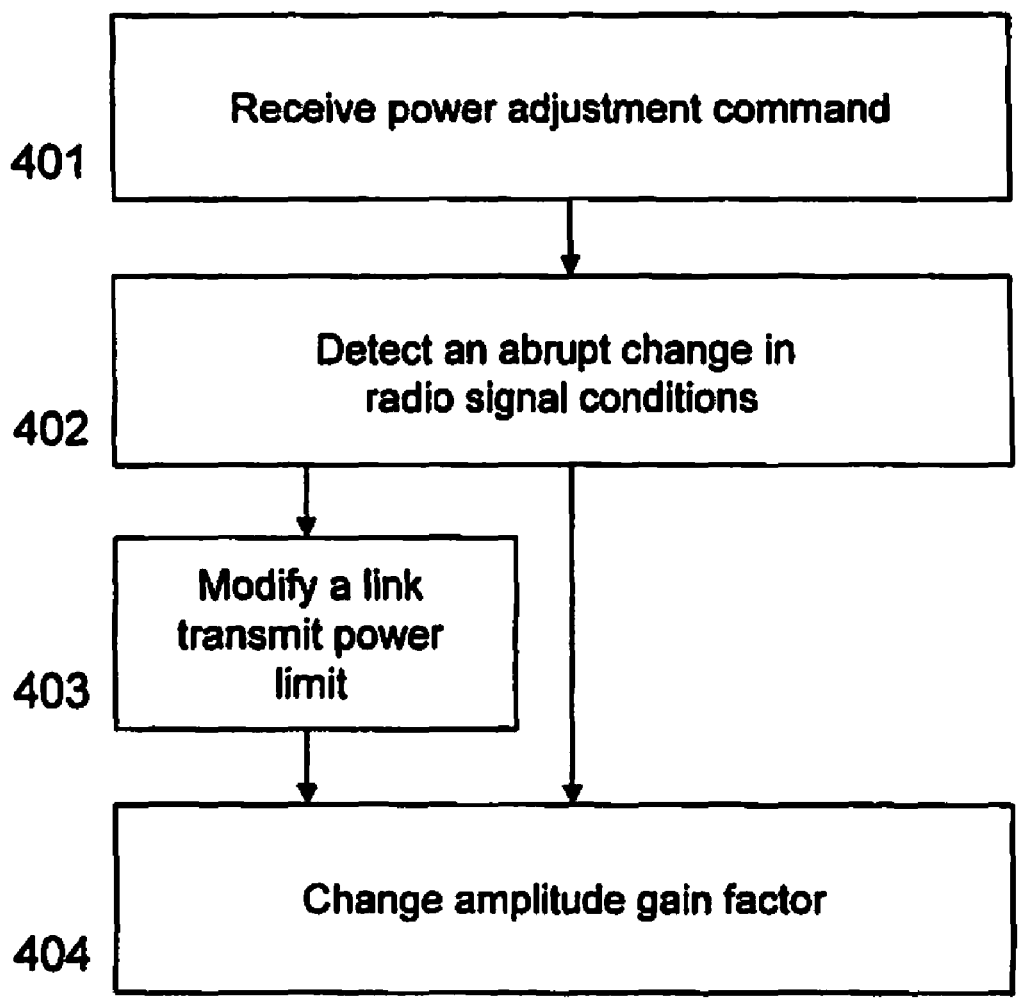
FIG. 4 is a flow chart illustrating a method in a second node for adjusting the transmission power of radio signals sent over a radio link.

FIG. 4 is a flowchart illustrating a method in a second node 120 for adjusting the transmission power of radio signals sent over a radio link to be received by a first node 110 in a radio communication system.

In some embodiments, the second node 120 may be a base station, a wireless communications station, a fixed station, a control station, a repeater or any similar arrangement for radio communication and the first node 110 may be a user equipment such as a mobile cellular radiotelephone, a Personal Digital Assistant (PDA), a laptop, a computer or any other kind of device capable of communicate radio resources.

However, the situation may as well be the opposite, such as in some other embodiments, wherein the second node 120 may be a user equipment such as a mobile cellular radiotelephone, a PDA, a laptop, a computer or any other kind of device capable of communicate radio resources and the first node 110 may be a base station, a wireless communications station, a fixed station, a control station, a repeater or a similar arrangement for radio communication.

However, in this text the term base station 120 will be used for the second node 120 and the term user equipment 110 will be used for the first node 110 in order to facilitate the comprehension of the present method.

The radio communication system is based on technologies such as e.g. Code division multiple access (CDMA), Wideband Code Division Multiple Access (WCDMA), CDMA 2000, High Speed Downlink Packet Data Access (HSDPA), High Data Rate (HDR) etc.

The purpose of the present method is to further improve the performance of the method previously described in accordance with FIG. 2. However, the present method may in some embodiments run independently from the previously described method according to FIG. 2. The method comprises the steps of:

Step 401

In step 401, the base station 120 receives a power adjustment command from the user equipment 110 for adjusting the transmission power such that a power level adequate for achieving a predetermined quality target is reached. The quality target may be BLER, FER, BER, TPC command error rate or any other convenient quality target parameter such as outage probability as previously described in accordance with the method depicted in FIG. 2.

The power of the signals transmitted from the base station 120 has a certain maximum limit and a certain minimum limit, which may be set in advance so that the power used by the base station 120 is limited by the maximum and minimum values, respectively.

Step 402

In step 402 is an abrupt change in the conditions of the radio signals received from the user equipment 110 detected when a power adjustment command to increase the power, such as a TPC UP command, is received in step 401 and the maximum limit of the power of the transmitted signals is reached. An abrupt change in the conditions of the radio signals received from the user equipment 110 may also be detected when a power adjustment command to decrease the power, such as a TPC DOWN command, is received 401 and the minimum limit of the power of the transmitted signals is reached.

The detection in step 402 of an abrupt change in the conditions of the received radio signals according to the present method in the base station may indicate that a windup situation has occurred and that anti-windup with particular advantage may be activated.

Step 403

In step 403 is one possible anti-windup operation performed, which may be used in some embodiments of the present method is to modify the link transmit power limits e.g. depending on the kind of power adjustment command that is received 401 from the user equipment 110. The modification of the link transmit power limits may be performed by increasing or decreasing the link transmit power limits. E.g. modifying by increasing the link transmit power limit by a certain margin if consecutive increasing power adjustment commands are received 401 from the user equipment 110 when the maximum radio link transmit power is reached. Thus radio signals may be sent with a higher power from the base station 120. Also, correspondingly, modifying by decreasing the link transmit power limit by a certain margin if consecutive increasing power adjustment commands are received 401 from the user equipment 110 but the minimum radio link transmit power is reached.

Further, information related to the modified link transmit power limits may be sent from the base station 120 to the user equipment 110 in order to assist the user equipment 110 in detecting the change in radio signal conditions.

Step 404

In step 404 another possible anti-windup operation may be performed, which may be used in some embodiments of the present method. This anti-windup operation is performed by changing amplitude gain factors between different channels, e.g. when the radio link transmitted power limits are repeatedly modified in step 403, as lowered or increased, or when an abrupt change in radio signal conditions is detected in step 402.

The amplitude gain factor is the ratio between the amplitude of the data channel and the amplitude of the control channel. The gain factors may be set by the network both in the base station 120 and in the user equipment 110. By increasing the gain factors, the network can increase the power on a given channel. For instance if the radio signal quality on a channel is bad, the network may increase gain factor on that channel.

Figure 5:
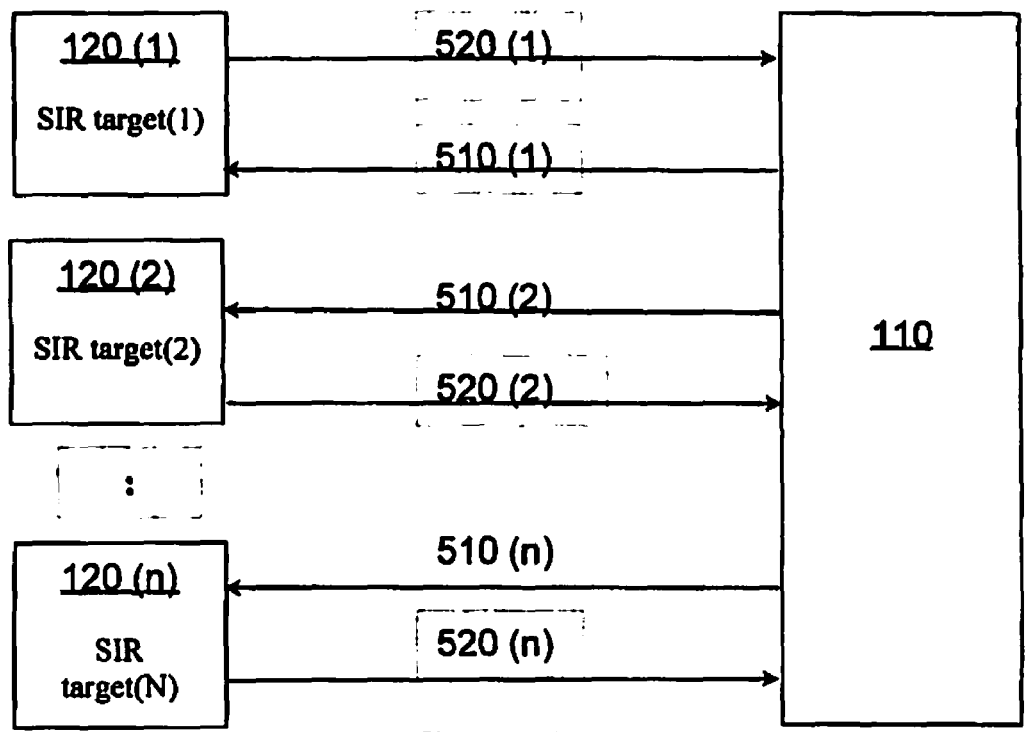
FIG. 5 is illustrating a method for handover.

Another possible anti-windup operation, which may be used in some embodiments of the present method, is to initiate a handover. This may be done for example if the link transmitted power limits are repeatedly modified in step 403, e.g. lowered or decreased or when an abrupt change in radio signal conditions is detected 402. A handover may alternatively be initiated after a change of the amplitude gain factors between different channels 404. In FIG. 5 is an uplink outer loop power control in a handover scenario depicted. This is a scenario where outer loop power controls operates in the base stations 120 (1), 120 (2), . . . , 120 (n). In case of handovers more than one radio link 510 (1), 510 (2), . . . , 510 (n) is used. Thus in handover, the outer loop power control runs on each radio link 510 (1), 510 (2), . . . , 510 (n) independently. In other words, a separate SIR target value is generated in each base station 120 (1), 120 (2), . . . , 120 (n), for each radio link 510 (1), 510 (2), . . . , 510 (n) to the user equipment 110. These SIR target values are then, at each base station 120 (1), 120 (2), . . . , 120 (n) independently compared with the measured SIR on each radio link, to generate TPC commands 520 (1), 520 (2), . . . , 520 (n) for controlling the transmitted power from the user equipment 110, the uplink power.

Similarly the detection in step 402 of the variation in radio conditions from bad to good and vice versa, and the corresponding correction in each base station 120 (1), 120 (2), . . . , 120 (n), may be performed independently.

In the same way the detection in step 402 of a windup situation, whereby the normal outer loop power control is suspended temporarily and the subsequent resumption of the outer loop power control with fast convergence may be independently performed in each base station 120 (1), 120 (2), . . . , 120 (n).

In this example, n radio links 510 (1), 510 (2), . . . , 510 (n) in handover is assumed. The SIR target may be set according to the normal outer loop power control or may, whenever necessary due to radio signal conditions, be generated temporarily according to any of the previously described methods, independently in each base station 120 (1), 120 (2), . . . , 120 (n) as shown in FIG. 5.

Thus if a radio signal degrades abruptly on one link 510 (1), 510 (2), . . . , 510 (n), the chance is good that a stronger radio signal will be available at one of the other links. In such a case, a handover may be initiated.

Figure 6:
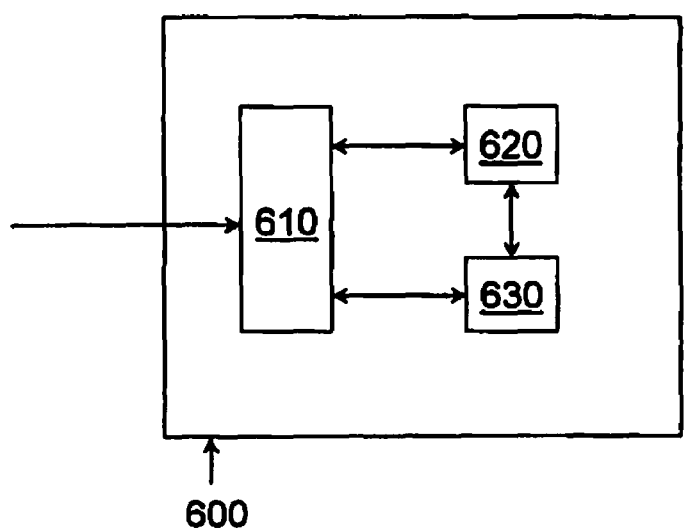
FIG. 6 is a block diagram illustrating an arrangement in a second node for adjusting the transmission power of radio signals sent over a radio link.

To perform the method steps in the base station 120 described in relation to FIG. 4 for adjusting the transmission power of radio signals sent over a radio link from a base station 120 to be received by the user equipment 110, the base station 120 comprises an arrangement 600 as depicted in FIG. 6. The arrangement 600 in the base station 120 comprises a receiving unit 610 being adapted to receive a power adjustment command from the user equipment 110 for adjusting the transmission power such that a power level adequate for achieving a predetermined quality target of the link. The power of the transmitted signals has a certain maximum and minimum value. The base station arrangement 600 comprises a detection unit 620 adapted to detect an abrupt change in the conditions of the radio signals received from the first node 110.

The arrangement 600 further comprises a processor 630 which together with computer program code controls the functions of the method previously explained in association with FIG. 4.

The methods for adjusting the transmission power of radio signals sent over a radio link from a base station 120 according to the present methods can be implemented through one or more processors, such as the processor 630 in the base station arrangement 600 depicted in FIG. 6 and the processor 350 in the user equipment arrangement 300 depicted in FIG. 3, together with computer program code for performing the functions of the methods. The program code mentioned above may also be provided as a computer program product, for instance in the form of a data carrier carrying computer program code for performing the method according to the present invention when being loaded into the base station 120 and/or the user equipment 110. The data carrier may be a CD ROM disc, a memory stick, or any other medium such as a disk or tape that can hold machine readable data. The computer program code can furthermore be provided as pure program code on a server and downloaded to the base station 120 and/or user equipment 110 remotely.

While the methods and arrangements described in this document are susceptible to various modifications and alternative forms, specific embodiments thereof are shown by way of example in the drawings and are herein described in detail. It should be understood, however, that there is no intent to limit the present methods and arrangements to the particular forms disclosed, but on the contrary, the present methods and arrangements are to cover all modifications, equivalents, and alternatives falling within the spirit and scope of the methods and arrangements as defined by the claims.

Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which these methods and arrangements belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration, embodiments of the present methods and arrangements are described herein in the context of a user equipment 110 and a base station 120. It will be understood, however, that the present methods and arrangements are not limited to such embodiments and may be embodied generally as any electronic device that includes radio signal propagation means thereon.

The invention claimed is:

1. A method in a first node of a wireless network for adjusting the transmission power of radio signals sent over a radio link from a second node to be received by the first node, the method comprising:

maintaining a quality target of the link by generating Signal to Interference-and-noise Ratio target (SIR target) values by means of running an outer loop power control, generating power adjustment commands based on the SIR target values, and sending the power adjustments to the second node for adjusting the transmission power such that a power level adequate for providing the quality target of the link is achieved;

detecting an abrupt change in the conditions of the radio signals received from the second node;

generating a temporary SIR target value in response to detecting the abrupt change; and temporarily replacing the SIR target value generated by the outer loop power control with the temporary SIR target value when generating the power adjustment commands to be sent to the second node for adjusting the transmission power.

2. The method of claim 1, further comprising:

detecting a stability in the conditions of the radio signals received from the second node while the SIR target value generated by the outer loop power control is replaced with the temporary SIR target value;

terminating the generation of temporary SIR target values; and resuming the use of SIR target values generated by the outer loop power control.

3. The method of claim 2, wherein detecting the stability in the conditions of the radio signals received from the second node comprises determining that a difference between the numbers of generated power control commands for increasing and decreasing the transmission power at the second node, respectively, is below a predetermined threshold value, and that the link quality target is achieved.

4. The method of claim 2, wherein detecting the stability in the conditions of the radio signals received from the second node comprises determining that the power of the transmitted signals from the second node to the first node is within a predetermined range and that a certain period of time has passed since the abrupt change in radio signal conditions was detected.

5. The method of claim 2, wherein detecting the stability in the conditions of the radio signals received from the second node comprises determining that a measured link quality error state is altered from "correct" to "erroneous" or from "erroneous" to "correct".

6. The method of claim 2, wherein resuming the use of SIR target values generated by the outer loop power control comprises setting a first SIR target value after such resuming to a predetermined value corresponding to the received link quality, if the time period for which temporary SIR targets were used exceeds a predetermined time duration at the resuming of the use of SIR target values generated by the outer loop power control.

7. The method of claim 2, wherein resuming the use of SIR target values generated by the outer loop power control comprises:

measuring SIR for a received signal over the entire time period for which the outer loop power control is suspended;

calculating an average value of the measured SIR; and setting a first SIR target value after such resuming to average value of the measured SIR, if the time period exceeds a certain time duration at the resuming of the use of SIR target values generated by the outer loop power contr.

8. The method of claim 1, wherein detecting the abrupt change in the conditions of the received radio signals comprises determining that a measured difference in averaged received power over a measurement period exceeds a predetermined threshold value.

9. The method of claim 1, wherein detecting the abrupt change in the conditions of the received radio signals comprises determining that a difference in averaged measured orthogonality over a measurement period falls below a predetermined threshold value.

10. The method of claim 1, wherein detecting the abrupt change in the conditions of the received radio signals comprises determining that a measured difference in averaged received power over a measurement period exceeds a predetermined threshold value and a difference in averaged measured orthogonality over a measurement period falls below a predetermined second threshold value.

11. The method of claim 1, wherein detecting the abrupt change in the conditions of the received radio signals comprises determining that a maximum or minimum power limit of the signal from the second node is reached.

12. The method of claim 1, wherein detecting the abrupt change in the conditions of the received radio signals comprises determining that a difference between a number of generated power control commands for increasing and decreasing the transmission power at the second node exceeds a predetermined threshold value within a certain time period in which all received blocks during the said period at the first node are erroneous.

13. The method of claim 12, wherein detecting the abrupt change in the conditions of the received radio signals comprises determining that a measured difference in averaged received power between a number of consecutive transmission periods remain within a predetermined threshold value.

14. The method of claim 1, wherein generating the temporary SIR target value is performed by setting the temporary SIR target value to a predetermined value corresponding to the detected radio signal conditions.

15. The method of claim 1, wherein generating the temporary SIR target value comprises generating the temporary SIR target value using an outer loop power control that uses a dynamic SIR target step size, where the said SIR target step size is progressively increased until a measured link quality error state is altered from "correct" to "erroneous".

16. The method of claim 1, wherein generating the temporary SIR target value comprises generating the temporary SIR target value using an outer loop power control that uses an SIR target step size that is proportional to the magnitude of the change in radio signal conditions.

17. The method of claim 1, wherein generating the temporary SIR target value comprises setting the temporary SIR target value to a prior SIR target value generated by the outer loop power control before the abrupt change in radio signal conditions was detected.

18. The method of claim 1, wherein the first node of a wireless network is a user device.

19. The method of claim 1, wherein the first node of a wireless network is a base station.

20. A first node in a wireless network, configured to maintain a quality target for radio signals sent over a radio link from a second node to the first of the link by generating Signal to Interference-and-noise Ratio target (SIR target) values by means of running an outer loop power control, generating power adjustment commands based on the SIR target values, and sending the power adjustments to the second node for adjusting the transmission power such that a power level adequate for providing the quality target of the link is achieved, the first node comprising:
  a detecting unit configured to detect an abrupt change in the conditions of the radio signals received from the second node;
  a generating unit configured to generate a temporary SIR target value in response to detecting the abrupt change; and
  a replacement unit configured to temporarily replace the SIR target value generated by the outer loop power control with the temporary SIR target value when generating the power adjustment commands to be sent to the second node for adjusting the transmission power.

21. The first node of claim 20, wherein the detecting unit is configured further to detect a stability in the conditions of the radio signals received from the second node while the SIR target value generated by the outer loop power control is replaced with the temporary SIR target value, and wherein the first node further comprises a resuming unit configured to terminate the generation of temporary SIR target values and to resume the use of SIR target values generated by the outer loop power control in response to the detection of the stability in the conditions of the received radio signals.

* * * * *

UNITED STATES PATENT AND TRADEMARK OFFICE
CERTIFICATE OF CORRECTION

| | | |
|---|---|---|
| PATENT NO. | : 8,150,447 B2 | Page 1 of 1 |
| APPLICATION NO. | : 12/518544 | |
| DATED | : April 3, 2012 | |
| INVENTOR(S) | : Kazmi et al. | |

It is certified that error appears in the above-identified patent and that said Letters Patent is hereby corrected as shown below:

In Column 2, Line 52, delete " $\max(SIR_{t\_OL^k},$ " and insert -- $\max(SIR_{t\_OL^i},$ --, therefor.

In Column 12, Line 63, delete "which where" and insert -- which were --, therefor.

In Column 12, Line 64, delete "where" and insert -- were --, therefor.

In Column 15, Line 1, delete "TPC_Up Total" and insert -- TPC_Up_Total --, therefor.

In Column 15, Line 49, delete "where" and insert -- were --, therefor.

In Column 16, Line 11, delete "$T_w>T_t$," and insert -- $T_w>T_t$ --, therefor.

In Column 22, Line 55, in Claim 7, delete "contr." and insert -- control. --, therefor.

Signed and Sealed this
Second Day of October, 2012

David J. Kappos
*Director of the United States Patent and Trademark Office*